United States Patent
Sadot et al.

(10) Patent No.: US 8,483,570 B2
(45) Date of Patent: Jul. 9, 2013

(54) METHOD AND APPARATUS FOR INCREASING THE CAPACITY OF A DATA COMMUNICATION CHANNEL

(75) Inventors: Dan Sadot, Kfar Bilu (IL); Gilad Kats, Ashdod (IL)

(73) Assignee: Multipon Networks Ltd., Omer (IL)

( * ) Notice: Subject to any disclaimer, the term of this patent is extended or adjusted under 35 U.S.C. 154(b) by 552 days.

(21) Appl. No.: 12/601,980

(22) PCT Filed: May 26, 2008

(86) PCT No.: PCT/IL2008/000708
§ 371 (c)(1),
(2), (4) Date: Jun. 14, 2010

(87) PCT Pub. No.: WO2008/146275
PCT Pub. Date: Dec. 4, 2008

(65) Prior Publication Data
US 2010/0247107 A1    Sep. 30, 2010

(30) Foreign Application Priority Data

May 28, 2007  (IL) .......................................... 183475
Feb. 7, 2008   (IL) .......................................... 189365

(51) Int. Cl.
*H04B 10/00* (2006.01)
(52) U.S. Cl.
USPC ........................................................ 398/140
(58) Field of Classification Search
USPC ........................................................ 398/141
See application file for complete search history.

(56) References Cited

U.S. PATENT DOCUMENTS

| 5,510,919 | A | 4/1996 | Wedding |
| 7,110,681 | B1 * | 9/2006 | Mizuochi ...................... 398/183 |
| 2002/0114034 | A1 * | 8/2002 | Way .............................. 359/124 |
| 2004/0131089 | A1 | 7/2004 | Uemura et al. |

FOREIGN PATENT DOCUMENTS

JP    2002281095 A    9/2002

OTHER PUBLICATIONS

"Optical Networks: A Practical Perspective" by R. Ramaswami et al., Academic Press, 1998, pp. 141-150.*

(Continued)

*Primary Examiner* — Shi K Li
(74) *Attorney, Agent, or Firm* — Marsteller & Associates, P.C.

(57) ABSTRACT

Method for efficiently increasing the capacity of an optical channel which can operate in a given data rate B, by generating N modulated data streams with a bit rate of B/N and a bit-time of N/B at the transmission end, to be simultaneously transmitted from a transmission end to a receiving end of the channel. A shift of 1/B*N between the first modulated data stream and each of its N−1 subsequent modulated data streams is generated using time delay or phase shifting and then the first modulated data stream and its shifted subsequent modulated data streams are combined into a composite multilevel signal with up to N levels and the composite multilevel signal is transmitted to a receiving end of the channel. At the receiving end, the composite multilevel signal is sampled N times during each bit-time, in order to obtain a vector with N elements at each time, such that each element has N+1 possible values and corresponds to the order of a sample. Each of the N modulated data streams are reconstructed by vectorial MLSE, preformed for each element by calculating the joint conditional PDF.

19 Claims, 6 Drawing Sheets

OTHER PUBLICATIONS

Farbert A. et al.: "Performance of a 10.7 Gb/s Receiver with Digital Equalizer using Maximum Likelihood Sequence Estimation" Proc. European Conference on Optical Communication (ECOC 2004, TH.4.1.5 2004), Sep. 2004, pp. 10-11, XP009106126.

Katz G et al: "Time-Division Multilevel Multiplexing Communication Method" IEEE Photonics Technology Letters, IEEE Service Center, Piscataway, NJ, US,. vol. 19, No. 20, Oct. 15, 2007, pp. 1619-1621, XP011192410; ISSN: 1041-1135.

* cited by examiner

METHOD AND APPARATUS FOR INCREASING THE CAPACITY OF A DATA COMMUNICATION CHANNEL

FIELD OF THE INVENTION

The present invention relates to the field of data communication. More particularly, the invention relates to a method and apparatus for efficiently increasing the capacity of an optical data channel by performing a combination of Time Division Multiplexing with Multilevel Signals Multiplexing.

BACKGROUND OF THE INVENTION

Many modern telecommunications data channels use optical fibers for data transmission, due to their higher bandwidth and low attenuation. Today, optical fiber infrastructure start reaching apartment buildings and even private homes, so as to allow providing wideband services, such as Triple Play (a Triple Play service bundles high-speed Internet access, television, such as TV broadcast or Video on Demand and telephone service over a single broadband connection) and High-Definition television (HDTV). Since there is a growing demand for such wideband services, even the optical infrastructure may become overloaded.

Data in an optical data channel is transmitted by a laser source that is intensity modulated according to a desired rate, in order to reduce costs, such modulation is generally implemented directly, by switching the power supply to the laser source on and off at the desired rate. This allows using relatively cheap modulation scheme at the transmitting side. However, by doing so, the quality of the modulated optical signal is deteriorated due to transient effects named transient chirp, (e.g., unstable frequency) that generally appear during the rise and fall times of the amplitude of the laser signal, and frequency changes due to laser intensity changes named adiabatic chirp. These frequency broadening effects result in bit smear at the receiver end.

In addition, the quality of the modulated optical signal is deteriorated due to chromatic dispersion, which is a phenomenon that causes the separation of an optical wave confined to a waveguide (e.g., an optical fiber) into spectral components with different wavelengths, due to a dependence of the wave's velocity on its wavelength and the dispersion of the materials they propagate through. Such dispersion leads to signal degradation because of the varying delay in arrival time between different components of a signal distorts the signal in time. The problem becomes more severe as the frequency of the laser source increases with time (producing a chirp signal). One conventional way to reduce the effect of this problem is to reduce the bandwidth of the laser source. However, such reduction also reduces the data rate of the transmitted signal.

One conventional way to increase the number of different channels that share the same fiber is to use Time-Division Multiplexing (TDM) is a method of putting multiple data streams in a single signal by separating the signal into many segments, each having a very short duration. Each individual data stream is reassembled at the receiving end based on the timing. However, this solution still limits the capacity of the data channel, since only a single channel transmits at each time slot. In addition, this requires reducing the bit-time (i.e., increasing the transmission rate), which is a costly solution.

Another way to increase the number of different channels that share the same fiber is to use Wavelength-division multiplexing (WDM), where different wavelengths which are transmitted simultaneously. Each laser is modulated by an independent set of signals. Wavelength-sensitive filters are used at the receiving end. However, this solution requires several high quality laser sources with different frequencies and is therefore, costly.

Another way to increase the data rate and eliminate transient effects involved with direct modulation is to use external modulation scheme. According to this scheme, a single CW laser source is modulated by an external modulator. The external modulation eliminates the spectral broadening associated with the transient and adiabatic chirp, thus improves the channel capacity. However, this solution is also problematic, since the external modulator is costly, and has insertion-loss that attenuates the signal.

An additional way to increase the channel capacity is to use multilevel multiplexing of signals. According to this way, the number of channels that can transmit simultaneously can be multiplied by N by allocating $2^N$ different levels to the transmitted signal (e.g., 16 different levels for a multiplication factor of 4). This entails dividing the energy of the transmitted signal by $2^N$. As a result, the Signal to Noise Ratio (SNR) is deteriorated by a factor of $2^N$.

All the methods described above have not yet provided satisfactory solutions to the problem of efficiently increasing the capacity of an optical data channel in a low cost manner for Passive Optical Network (PON) application, which eliminates the drawbacks of prior-art solutions.

It is therefore an object of the present invention to provide a method and apparatus for efficiently increasing the capacity of an optical data channel, without changing the properties of the fiber channel.

It is another object of the present invention to provide a method and apparatus for efficiently increasing the capacity of an optical data channel, while reducing the optical dispersion effect along the fiber.

It is a further object of the present invention to provide a method and apparatus for efficiently increasing the capacity of an optical data channel, which allows using cheaper modulation schemes of the laser sources.

It is still another object of the present invention to provide a method and apparatus for efficiently increasing the capacity of an optical data channel, while accurately reconstructing the transmitted signals at the receiver side.

It is yet another object of the present invention to provide a method and apparatus for efficiently increasing the capacity of an optical data channel, while maintaining higher SNR of the transmitted signal.

It is yet another object of the present invention to provide a low cost platform for increasing the capacity of an optical data channel.

It is yet another object of the present invention to provide a low cost platform for increasing the capacity of an optical data channel with improved power budget and lower noise PSD.

It is yet another object of the present invention to provide a low cost platform for increasing the capacity of an optical data channel with improved responsivity of the optical detector at the receiving side.

Other objects and advantages of the invention will become apparent as the description proceeds.

SUMMARY OF THE INVENTION

The present invention is directed to a method for efficiently increasing the capacity of a data channel, such as an optical channel which can be over 100 km long, that can operate in a given data rate B, which can be 10 Gb/s PON. Accordingly, N modulated data streams with a bit rate of B/N and a bit-time of N/B are generated at the transmission end (e.g., by using low cost laser sources with direct modulation), to be simultaneously transmitted from a transmission end to a receiving end of the channel. A shift of 1/B*N between the first, modulated data stream and each of its N−1 subsequent modulated data streams is generated, e.g., by using time delay or phase shifting and then the first modulated data stream and its shifted subsequent modulated data streams are combined into a composite multilevel signal with up to N levels and the composite multilevel signal is transmitted to a receiving end of the channel. At the receiving end, the composite multilevel signal is sampled. N times during each bit-time, in order to obtain a vector with N elements at each time, such that each element has N+1 possible values and corresponds to the order of a sample. Each of the N modulated data streams are reconstructed by vectorial MLSE (e.g., using Viterbi Algorithm), preformed for each element by calculating the joint conditional PDF.

Preferably, the composite multilevel signal is processed at the receiving side as having MAI with deterministic properties and is corrected as ISI. The data channel may be a channel into which several optical signals with different frequencies that are gathered using WDM.

The N modulated data streams may be generated from a data stream having a bit rate which is higher by a factor of N. The composite multilevel signal that contains data from N channels may be generated directly at the transmission side, by a single laser source, which can be directly modulated at a data rate B. The bandwidth of the receiver at the receiving side may be lower than B, up to B/N. Whenever the data channel is used for an application which is sensitive to port density, the number of transceivers may be reduced by a factor of N.

The present invention is also directed to a system for efficiently increasing the capacity of a data channel being capable of operating in a given data rate B between a transmission end and a receiving end, that comprises: a) a transmitter at the transmission end, for simultaneously transmitting N modulated data streams, each of which having a bit rate of B/N and a bit time of N/B, to a receiving end of the channel, consisting of:

a.1) a plurality of signal sources (e.g., low cost laser sources with direct modulation) for generating the N modulated data streams;

a.2) means for generating a shift of 1/B*N between the first modulated data stream and each of its N−1 subsequent modulated data streams;

a.3) a combiner for combining the first modulated data stream and its shifted subsequent modulated data streams into a composite multilevel signal having up to N levels;

b) a receiver a receiving end, for receiving the composite multilevel signal that consists of:

b.1) circuitry for sampling the composite multilevel signal N times during each bit-time and for obtaining a vector having N elements at each time, such that each element has N+1 possible value;

b.2) a processor for performing vectorial MLSE for each element by calculating the joint conditional PDF and for reconstructing each of the N modulated data streams.

The channel may be an optical data channel which is over 100 km long and a data rate of 10 Gb/s, for example Gb/s PON.

The proposed system can be operated also when the channel is a channel into which two or more optical signals having different frequencies are gathered using WDM. A single laser source which can be directly modulated at a data rate B, may be used at the transmission side for generating the composite multilevel signal.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF PREFERRED EMBODIMENTS

The present invention proposes a method that combines properties of time division multiplexing with multilevel multiplexing of signals, in order to efficiently increase the channel capacity. This unique combination is called hereinbelow Time Division Multilevel Multiplexing (TDMM) and allows increasing the bandwidth of data that can be transmitted through the channel by a factor of N (N represents the number of levels of the multilevel signal) or alternatively, allows the transmission of N independent channels through the fiber, or any combination thereof. The proposed method increases the bandwidth cost effectiveness and reduces the impact of fiber chromatic dispersion.

The system and method proposed by the present invention allow using low-cost low-frequency lasers with indirect modulation for high-speed fiber-optic transmission, rather than using a high-frequency laser that requires expensive direct modulation. In addition, the proposed method effectively mitigates the effect of fiber dispersion, due to the lower frequency used.

Figure 1A:
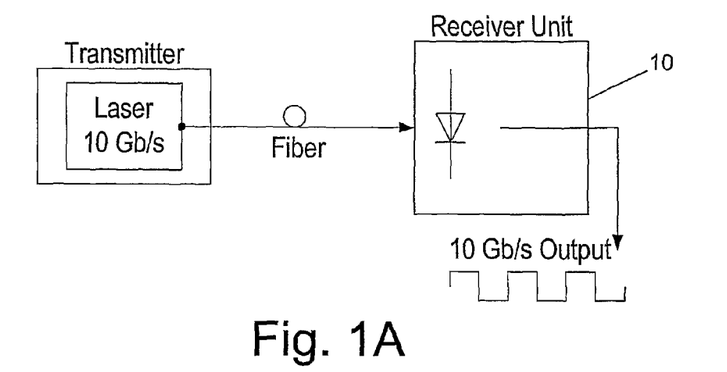
FIG. 1A (prior art) schematically illustrates a conventional serial transmission in a single channel with single CW laser-transmitter, modulated at 10 Gb/s.

FIG. 1A (prior art) schematically illustrates a conventional serial transmission in a single channel with single CW laser-transmitter, modulated at 10 Gb/s. This system uses a single laser source that transmits in a bit-rate of 10 Gb/s using an external modulator, A 10 GHz optical detector 10 is employed at the receiving side, for reconstructing the 1.0 Gb/s data stream. This conventional solution suffers from a high level of dispersion within the transmitted signal, due to the need for high bit-rate, which distorts the transmitted signal and causes Inter-Symbol-Interference (ISI) problems at the receiving end (ISI is a form of distortion of a signal that causes the previously transmitted symbols to have an effect on the currently received symbol, and have similar effect as noise due to the non-linear frequency response of the channel).

Figure 1B:
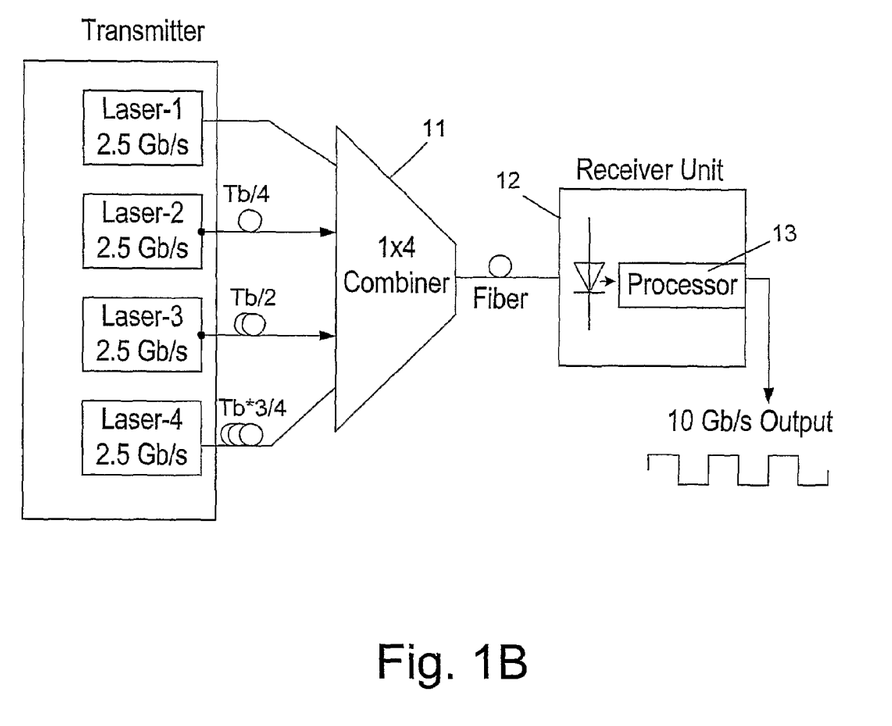
FIG. 1B schematically illustrates four independent 2.5 Gb/s channels that are designed to carry a total of 10 Gb/s data stream by using TDMM, according to a preferred embodiment of the invention.

FIG. 1B schematically illustrates four independent 2.5 Gb/s channels that are designed to carry a total of 10 Gb/s data stream by using TDMM, according to a preferred embodiment of the invention. This proposed solution is cost effective and efficient than the conventional solution.

In this example, the bit-rate of each optical channel is 2.5 Gb/s and the number of channels to be simultaneously transmitted is N=4. The four optical channels are combined by using an optical combiner 11, while each channel is shifted with respect to its neighboring channels (e.g., by introducing time delay, phase-shift or any other shifting technique). The shift between channels can be implemented either optically or electronically before being electrical-to-optical converted. The combined output of the shifted channels generates a composite multilevel signal that is transmitted trough the optical fiber to the receiver unit 12. At the receiver unit 12, the photodiode detector converts the optical signal into an electrical signal which, in turn, is further digitally processed by an appropriate processor 13, using estimation techniques. As a result, an output of 10 Gb/s (4×2.5 Gb/s) with minimal bit error rate is reconstructed.

This technique allows either lowering the transmission rate by a factor of N (thereby avoiding the need of increasing the TDM data rate), or conversely allowing the multiplexing of N independent channels, without needing costly WDM. Therefore, the proposed TDMM provides a cost effective and robust solution which is less susceptible to optical distortion effects, e.g., dispersion or other optical non-linearities.

Figure 2A:
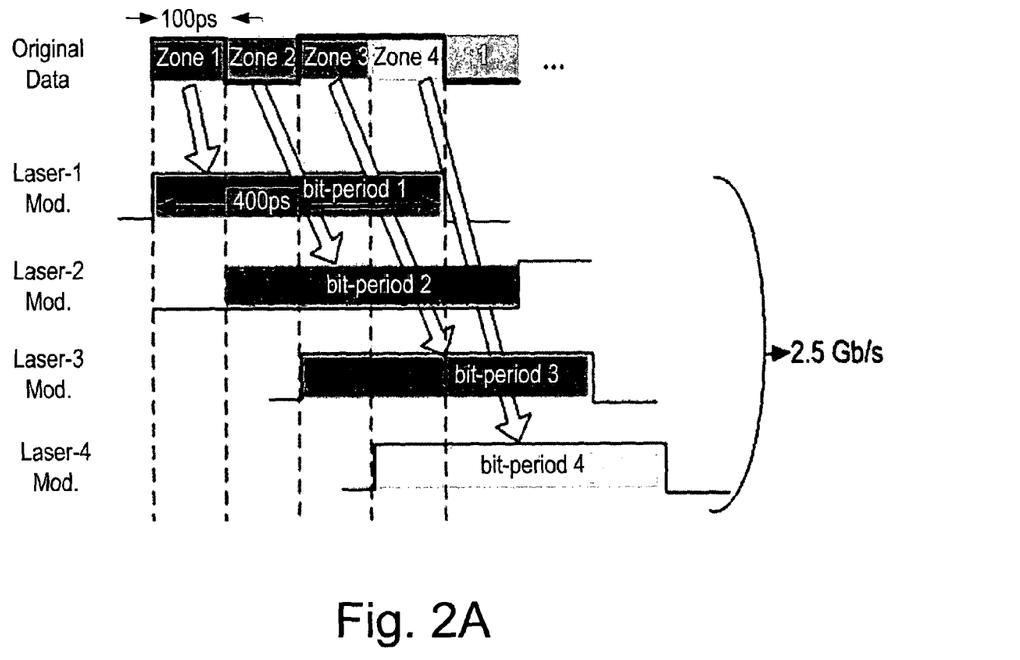
FIG. 2A schematically illustrates the conversion of a high frequency serial bit stream into four low frequency independent data streams, according to a preferred embodiment of the invention.

FIG. 2A schematically illustrates the conversion of a "1011" 10 Gb/s serial bit stream (symbol) into four 2.5 Gb/s independent data streams, according to a preferred embodiment of the invention. In the original symbol, the first bit (logic level "1") appears as zone1, the second bit (logic level "0") appears as zone2, the third bit (logic level "1") appears as zone3 and the fourth bit (logic level "1") appears as zone4. Every bit in the original symbol is mapped from its original time slot in the 10 Gb/s bit stream into a corresponding time slot of one of the four 2.5 Gb/s streams: the first bit ("1") is mapped into bit-period1 ("1" logic that lasts 400 pS, generated by laser source 1), the second bit ("0") is mapped into bit-period2 ("0" logic that lasts 400 pS, generated by laser source 2), the third bit ("1") is mapped into bit-period2 ("0" logic that lasts 400 pS, generated by laser source 3) and the fourth bit ("1") is mapped into bit-period2 ("0" logic that lasts 400 pS, generated by laser source 4). Each of the four laser sources operates at 2.5 Ghz and therefore its hit-time is 400 pS. The four 2.5 Gb/s streams are then combined to generate a unique multilevel composite signal (the "TDMM signal"): The bit-stream produced by laser source 1 is input to the optical combiner. The hit-stream produced by laser source 2 is also input to the optical combiner with a time shift of 100 pS with respect to the bit-stream of laser source 1. The bit-stream produced by laser source 3 is also input to the optical combiner with a time shift of 100 pS with respect to the bit-stream of laser source 2. The bit-stream produced by laser source 4 is also input to the optical combiner with a time shift of 100 pS with respect to the bit-stream of laser source 3. The number of levels are determined by the number of channels to be simultaneously transmitted, but in any case does not exceed N levels. FIG. 2C schematically illustrates practical (non-ideal) wave forms of the four 2.5 Gb/s independent data streams, shown in FIG. 2A.

Figure 2B:
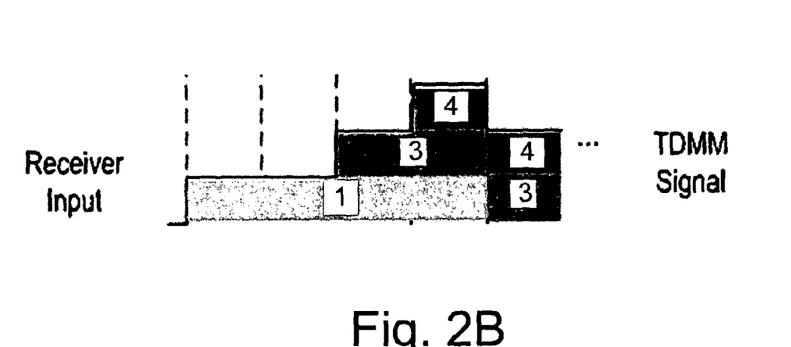
FIG. 2B illustrates the generated TDMM signal, according to a preferred embodiment of the invention.
Figure 2C:
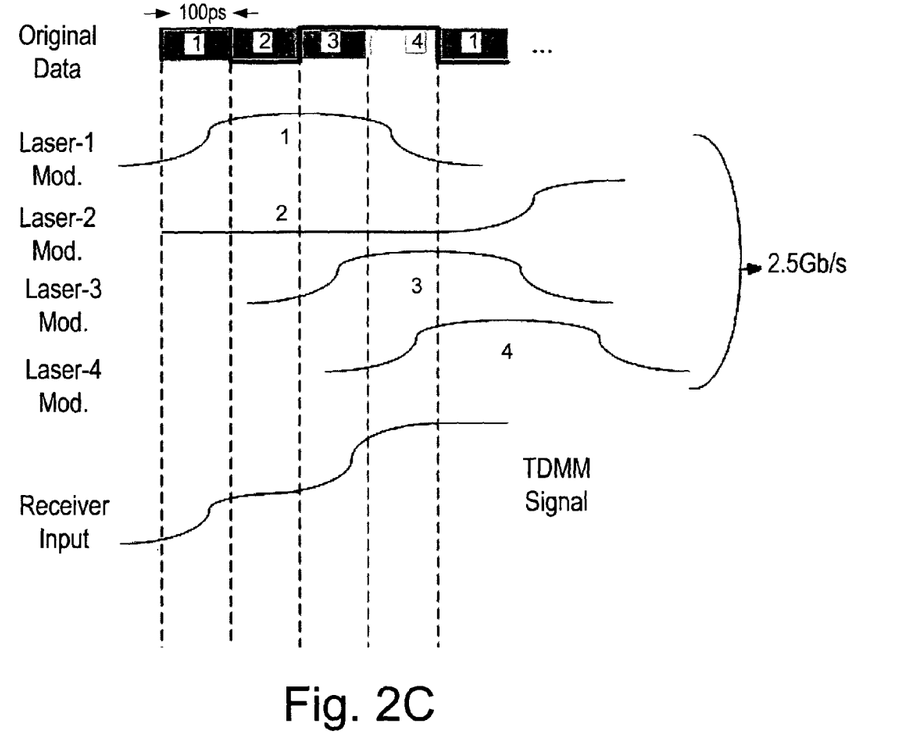
FIG. 2C schematically illustrates practical (non-ideal) wave forms of the four 2.5 Gb/s independent, data streams, shown in FIG. 2A.
Figure 2D:
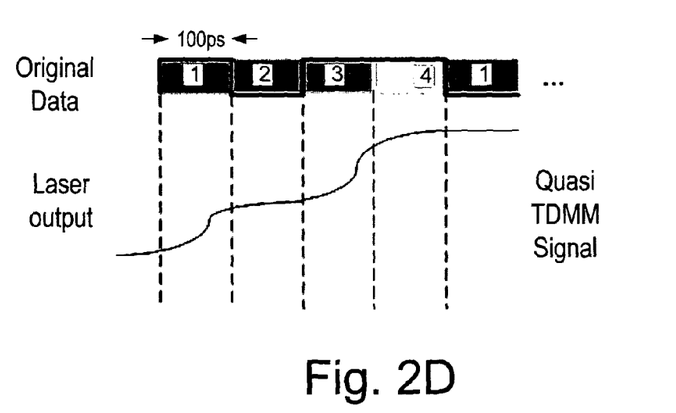
FIG. 2D schematically illustrates a quasi TDMM signal (which is a practical non-ideal wave form of the TDMM signal, shown in FIG. 2B)

FIG. 2B (noted "receiver input") represents the generated TDMM signal that corresponds to this example. During the first time slot of 100 pS, only the level "1" of the first mapped bit exists. During the second time slot, of 100 pS, the combined level remains "1", since the level of the second mapped bit during the second time slot is "0". During the third time slot of 100 pS, the combined level is "2", since the levels of the first, second and third mapped bits during that time slot are "1", "0" and "1", respectively. During the fourth time slot of 100 pS, the combined level is "3", since the level of the first, second third and fourth mapped bits during that time slot are "1", "0", "1" and "1", respectively. During the fifth time Mot of 100 pS, the combined level goes down to "2", since the level of the first, second third and fourth mapped bits during that time slot are "0", "0", "1" and "1", respectively. During the sixth time slot of 100 pS, the combined level returns to "3", since the level of the first, second third and fourth mapped bits during that time slot are "0", "1", "1" and "1", respectively. This response can be further determined for any preceding time slot. FIG. 2D schematically illustrates a quasi TDMM signal (which is a practical non-ideal wave form of the TDMM signal, shown in FIG. 2B).

It is clear that the proposed solution is advantageous, since it uses only partial timing shift between channels (compared to conventional TDM that requires full shift by a complete bit-time), for allowing N channels to transmit at the same time without using different frequencies (compared to conventional WDM that requires a full frequency separation between, channels). In addition, proposed solution requires only N different magnitude levels for being able to reconstruct the data of each channel (compared to conventional multilevel multiplexing that requires $2^N$ different magnitude levels). This fact results in much better inherent SNR of the TDMM signal.

According to the invention, a vectorial or a standard Maximum Likelihood Sequence Estimation (MLSE) processor 13 is used at the receiving side, in order to make the best possible decision on the received input signal. In addition, this MLSE processor 13 also performs Dispersion Compensation and therefore, eliminates the need for Electrical Dispersion Compensation (EDC) hardware for correcting distortion caused by chromatic dispersion and optical non-linearities. In order to recover the information with minimum Bit-Error-Rate (BER), it is necessary to sample the input signal at a sample rate of 10 Giga-samples/sec, even though the photodiode's electrical bandwidth may be of 2.5 GHz. Therefore, each time slot of 400 ps contains 4 samples. In FIG. 2B, the first 4 samples within the first 400 ps time slot are associated mainly with channel-1 (being the principal channel), whereas the additional contribution form the other channels is traditionally regarded as Multi-Access Interference (MAI), which are considered as noise originated from neighboring channels.

According to the invention, even though the additional contribution from the other channels is Multi-Access Interference (MAI), for the purpose of decoding it is regarded as conventional Inter-Symbol interference (ISI). The first group of four samples belongs to the first bit at the original 1.0 Gb/s data stream. The second group of four samples (which are shifted by 100 ps from the first group) are associate with channel-2 and therefore, belongs to the second bit at the original 10 Gb/s data stream. The 3rd group and the 4th group belong to the 3rd bit and 4th bit, respectively. The overlap between the groups are referred to as ISI. In this case, since the MAI is deterministic, it can be considered as an ISI caused by neighboring bits (rather than by neighboring channels). Therefore, it is possible to calculate the possible combinations for each channel and to decode each transmitted signal by properly analyzing and correcting the distortions.

It is well known that the best possible symbol detector for channel with ISI is the Maximum Likelihood Sequence Estimator (MLSE). The viability of the MLSE in 10 Gb/s communication system was demonstrated in "Performance of a 10.7 Gb/s Receiver with Digital Equalizer using Maximum Likelihood Sequence Estimation," A. Farbert et. al., Proc. European Conference on Optical Communication (ECOC 2004, Th.4.1.5 2004). The TDMM signal received is decoded by a TDMM decoder, using vectorial MLSE.

In conventional MLSE, if $N_T$ is the total number of symbols transmitted, the MLSE detector chooses among $2^N$, possible sequence the one that minimize the metric:

$$m_r = \sum_{k=1}^{N_T} -\ln(p(y(k)|c_j)) \quad (1)$$

where $p(y(k)|c_j)$ is the conditional Probability Density Function (PDF) of the received sampled signal $y(t)$ at the time $kT$, the channel state cj is generated by using the noise free version of the receive-transmit channel response i.e. $c_j = f(I_1^{(j)}, I_2^{(j)}, \ldots, I_{N_T}^{(j)})$, where $(I_1^{(j)}, I_2^{(j)}, \ldots, I_{N_T}^{(j)})$, $1 \leq j \leq 2^{N_T}$, are the candidate sequences and $f(\bar{x})$ represents the noise free channel response.

By using the Viterbi algorithm, efficient implementation minimization can be done, by properly exploiting the method of Viterbi algorithm and the fact that the number of combinations is deterministic (even though Viterbi algorithm was intended to solve problems of distortions caused by the optical channel, and not by simultaneous transmission into the channel from several laser sources). For channel with K interferers there are $N_c = 2^{K+1}$ states, thus, cj reduces to Nc possibilities and $1 \leq j \leq N_c$.

In the case of TDMM the signal $y(k)$ results from four samples per bit, associated with the contribution of the principal channel (the channel to be detected) and of the other three neighboring channels (or MAI). Therefore, each four samples group may be regarded as a vector:

$\bar{y}(k) = [y_1(k) y_2(k) y_3(k) y_4(k)]$ where the first element $y_1(k)$ in vector $\bar{y}(k)$ is the first sample, the second element is the second sample (with sample space of 100 ps) and the 3rd and the 4th elements are the 3rd and the 4th samples, respectively. Therefore, it is necessary to minimize the metric $$m_r = \sum_{k=1}^{N_T} -\ln(p(\bar{y}(k)|\bar{c}_j)), \quad (2)$$

where $p(\bar{y}(k)|\bar{c}_j)$ is the joint conditional PDF and $\bar{c}_j = [c_{1j} c_{2j} c_{3j} c_{4j}]$, and each vector element $Ci_j$, $1 \leq i \leq 4$ has 5 possible values ('0+0+0+0'–'1+1+1+1'). The possible number of state vectors is 128, i.e., $1 \leq j \leq 128$.

The 128 possibilities are derived by examining all the possible values of the received input in FIG. 2B: There are 2 possibilities of the principal, channel (binary '1' or '0'), and for each of the neighboring interfering channels there are 4 possibilities, as each of the neighboring channels is associated with two independent bits that overlap with the principal bit (see FIG. 2B), each bit containing either binary '1' or '0'. Therefore total number of possibilities (in the case of N=4 channels) is 2×4×4×4=128, The four elements in are independent, therefore:

$$p(\bar{y}(k)|\bar{c}_j) = p(\bar{y}(k)|c_{1j}) \cdot p(\bar{y}(k)|c_{2j}) \cdot p(\bar{y}(k)|c_{3j}) \cdot p(\bar{y}(k)|c_{4j}) \quad (3)$$

The TDMM MLSE is similar to the conventional MLSE, modified to a vectorial version, since it requires the calculation of the joint conditional PDF. For example: in the case of Gaussian distribution in each step in the trellis search a conventional MLSE requires the calculation of one dimensional Euclidian distance, whereas the TDMM Vectorial MLSE requires the calculation of 4-dimensional Euclidian distance.

Monte-Carlo simulations (spreadsheet simulations which randomly generate values for uncertain variables over and over to simulate a model) were carried out for back-to-back communication link and for 100 km link. The modulation format is On/Off Key (OOK) and a 214 pseudo-random bit sequence is used. The TDMM system (shown in FIG. 1B) is compared to conventional serial transmission system (shown in FIG. 1A). In the case of conventional communication system the laser is externally modulated at modulation rate of 10 Gb/s and its Full Width Half Maximum (FWHM) is 0.1 nm. In the case of TDMM communication system the four lasers' central frequencies are distanced by more than 0.1 nm, each laser is directly modulated at 2.5 Gb/s and due to laser chirp their FWHM is 0.1 nm. In both cases, the laser transmitters are assumed to have optical output power of 0 dBm, and the receiver consists of a photodiode followed by a Low Pass Filter (LPF), with a combined bandwidth of 10 GHz, and Additive White Gaussian Noise (AWGN) resulting from thermal noise.

Figure 3:
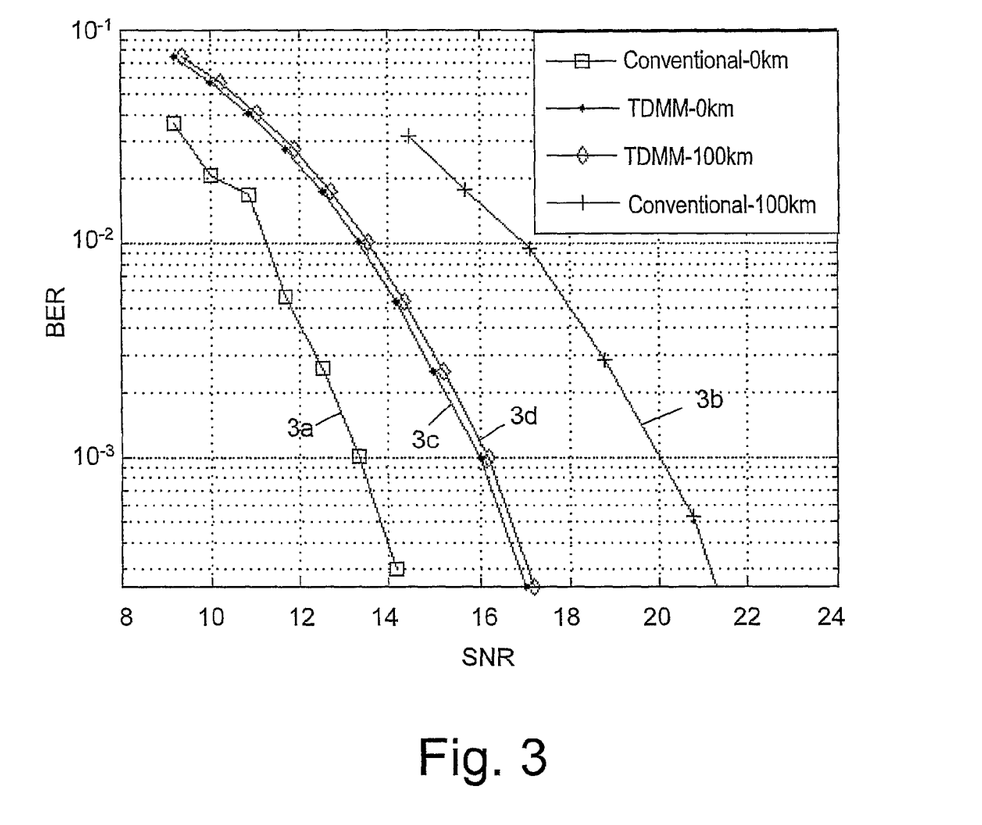
FIG. 3 illustrates the BER versus SNR comparison between the conventional serial high frequency system and a lower frequency system using the TDMM technique for back-to-hack and for 100 km link lengths, according to a preferred embodiment of the invention.

FIG. 3 illustrates the BER comparison between the conventional serial 10 Gb/s system and the 4×2.5 Gb/s system using the TDMM technique. The BER versus SNR at 10 Gb/s at 0 km and 100 km fiber lengths are shown for a conventional system (3a and 3b) and for TDMM system (3c and 3d). The lower BER curve and the uppermost BER curve represent the conventional 10 Gb/s system performance at 0 km (back-to-back) and after propagation of 100 km, respectively. The other two BER curves represent the TDMM system performance. It is observed that in the back-to-back case the conventional system outperforms the TDMM technique only by 2 dB (or less), although the TDMM signal suffers from sever interference due to MAI as discussed above. This MAI mitigation (that may be referred as ISI) is achieved by the using the TDMM vectorial MLSE presented above. At 100 km fiber length, it is observed that the TDMM outperforms the conventional communication link. This is associated with the higher spectral utilization of the proposed TDMM scheme.

It should be noted that for a 10 Gb/s serial system, the fiber length is limited to less than 10 km in directly modulated case, and limited to a few tens of km in externally modulated case, due to the chromatic dispersion. On the other hand, the proposed TDMM technique is immune to dispersion up to a few hundreds of km with the use of external modulator or alternatively, to a few tens of km with the use of direct modulation. A similar approach to reduce the effect of dispersion is described in "Subcarrier Multiplexing for High-Speed Optical Transmission", R. Hui et al. (Journal of Lightwave Technology, vol. 20, No. 3, pp. 417-426, March 2002) were a 10 Gb/s data stream was set up by 4×2.5 Gb/s data streams, using Sub-Carrier Multiplexing (SCM) technique. It was shown that the performance of conventional TDM system deteriorates rapidly, whereas the performance of the SCM system remains essentially unchanged up to 150 km.

As compared to external modulation (either by electro-absorption or Mach-Zender modulator) that is required in serial 10 Gb/s transmission over 10 Km, TDMM can be obtained with low cost direct modulation, similar to 2.5 Gb/s systems.

The proposed method can be implemented in data systems, such as a Passive Optical Network (PON), which is a system that brings optical fiber cabling and signals all or most of the way to the end user, e.g., fiber-to-the-curb (FTTC), fiber-to-the-building (FTTB), or fiber-to-the-home (FTTH).

According to another embodiment, the proposed TDMM technique may be implemented on a data channel with WDM, where N channels are multiplexed at each wavelength, rather than a single channel. Again, the capacity of the channel in case of WDM is increased by a factor of N.

According to a further embodiment, the proposed TDMM technique may be implemented directly on a single laser source that directly synthesizes the TDMM signal that contains data from several channels, sown in FIG. 2B (rather than generating it using hardware, e.g., by combining N channels with the desired shift, or than using a single 10 Gb/s that operates in traditional TDM mode, which is not efficient). In this case, the decoding process at the receiving side using the vectorial MLSE presented above will remain unchanged. If for example the proposed TDMM solution is used for 10 GHz PON, data from 4 channels of 2.5 Gb/s each can be transmitted using a single low cost (directly modulated) 10 GHz transmitter.

At the receiving side, the bandwidth of the receiver can be significantly lower than 10 GHz, even as low as 2.5 GHz (depending on the required performance). Since a lower bandwidth entails longer bit time, the solution proposed by the present invention also improves the overall power budget of the system (lower bitrate implies a longer bit time, thus keeping a constant bit energy requires less power). In this example, the bandwidth of the receiver is 4 times lower and therefore, the noise power is also 4 times lower. In addition, the noise power spectral density (PSD) is also lower in narrow bandwidth receivers.

By using a narrower bandwidth, it is also possible to improve the responsiveness of the detector. For example, in a data rate of 40 GHz, responsiveness is reduced by a factor of two, compared to 10 GHz. Therefore, the present invention eliminates such reduction. Furthermore, due to the narrower bandwidth, errors are correlative and this allows more errors to be contained in a bit stream to be processed by FEC (Forward Error Correction, which is a method of obtaining error correction in data transmission) hardware, without an deterioration of performance.

According to a further embodiment, it is possible to narrow the bandwidth as proposed by the present invention in an asymmetric manner, i.e., in the receiver or in the transmitter only. In this case, the overall power budget can be further improved due to lower distortion (distortion is caused only at one side).

Even though the TDMM signal consists of N independent data channels with a bandwidth of B/N for each channel, the total bandwidth of the aggregated TDMM signal is still of B/N This is also an additional advantage, as the receiver that can be used is a low cost receiver (compared to a conventional TDM receiver that requires a bandwidth of B and is therefore, more expensive).

This is an important advantage in case when the application is sensitive to port density, since the number of transceivers can be reduced by a factor of N, as compared to a conventional WDM solution. For example, four 10 Gb/s WDM ports (using four wavelengths) can be replaced by a single 40 Gb/s port, that is transmitted using TDMM over 100 Hz bandwidth (with a single wavelength).

Figure 1C:
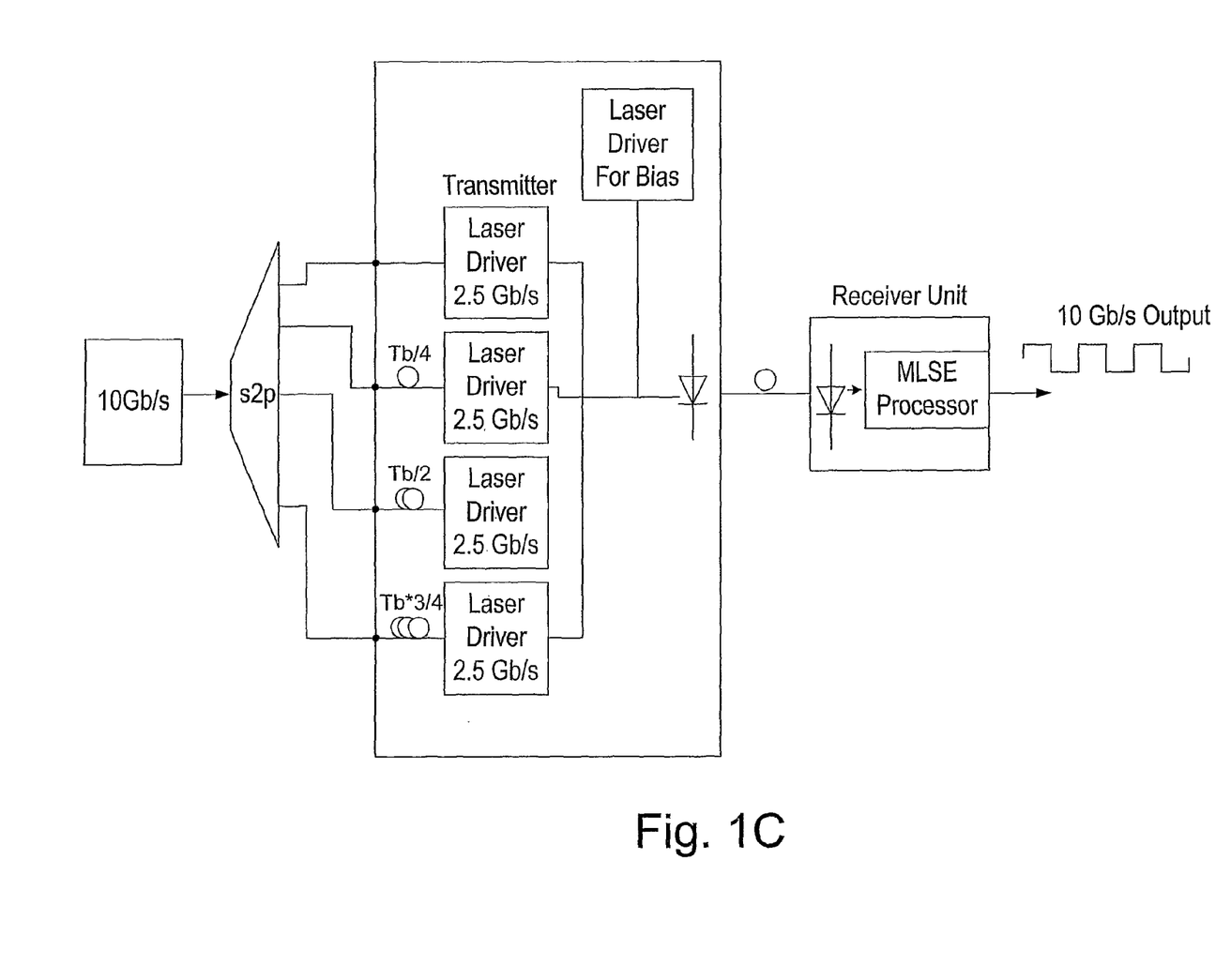
FIG. 1C schematically illustrates an implementation using a transmitter with a single 2.5 Gb/s modulated laser that is designed to carry a total of 10 Gb/s data stream by using TDMM, according to a preferred embodiment of the invention.

FIG. 1C schematically illustrates an implementation using a transmitter with a single 2.5 Gb/s modulated laser that is designed to carry a total of 10 Gb/s data stream by using TDMM, according to a preferred embodiment of the invention. This proposed solution is cost effective and efficient than the conventional solution.

In this example, a data stream with a bit-rate of 10 Gb/s is being input to a serial to parallel converter which converts is to four electronic channels, each of which is delayed with respect to its neighboring channels. The bit rate of each optical channel is 2.5 Gb/s and the number of channels to be simultaneously transmitted is N=4. The four electronic channels are combined by using an electronic combiner 111, while each channel is shifted with respect to its neighboring channels (e.g., by introducing time delay, phase-shift or any other shifting technique). The combined output of the shifted channels generates a composite multilevel electronic signal that is used to control a single laser modulator that modulates a single laser source at 2.5 GHz that generates a TDMM optical signal which is transmitted trough the optical fiber to the receiver unit 12. At the receiver unit 12, the photodiode detector converts the optical signal into an electrical signal which, in turn, is further digitally processed by an appropriate processor 13, using estimation techniques. As a result, an output of 10 Gb/s (4×2.5 Gb/s) with minimal bit error rate is reconstructed.

This implementation, as well, allows either lowering the transmission rate by a factor of N (thereby avoiding the need of increasing the TDM data rate), or conversely allowing the multiplexing of N independent channels, without needing costly WDM. Therefore, this example of TDMM implementation requires only a single low-cost laser source at 2.5 GHz (rather than four low-cost laser source at 2.5 GHz), thereby providing a cost effective and robust solution which is less susceptible to optical distortion effects, e.g., dispersion or other optical non-linearities.

Figure 1D:
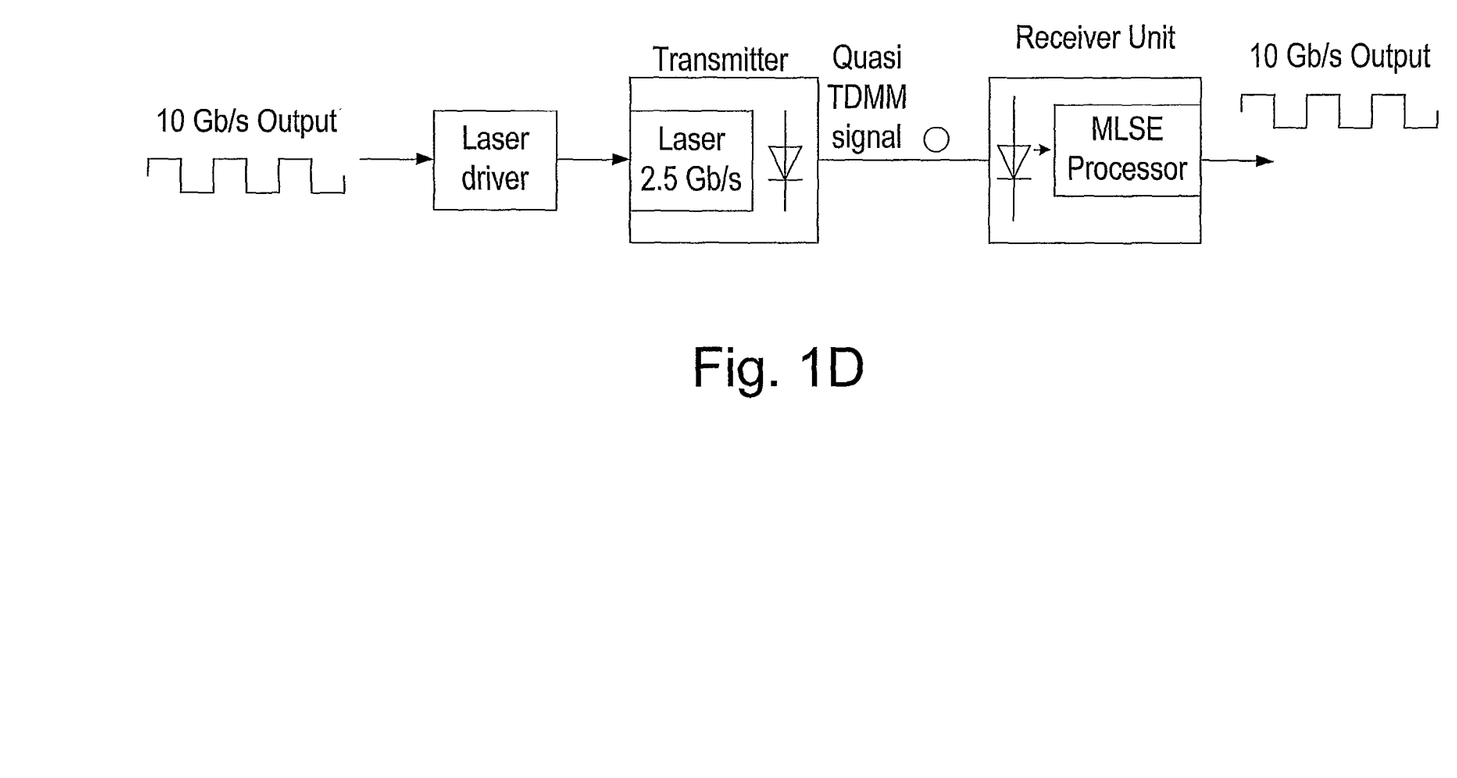
FIG. 1D schematically illustrates another implementation using a transmitter with a single 2.5 Gb/s modulated laser that is designed to carry a total of 10 Gb/s data stream by using TDMM, according to another preferred embodiment of the invention.

FIG. 1D schematically illustrates another implementation using transmitter with a single 2.5 Gb/s modulated laser that is designed to carry a total of 10 Gb/s data stream by using TDMM, according to another preferred embodiment of the invention. This proposed solution is even more cost effective and efficient than the conventional solution.

In this example, a data stream with a bit-rate of 10 Gb/s is being input to a single driver with a limited bandwidth of 2.5 GHz which also functions as a LPF (here again, the bit-rate of the optical channel is 2.5 Gb/s) and, also in turn, generates the composite multilevel electronic signal that is used to modulate a single laser source at 2.5 GHz that generates a TDMM optical signal which is transmitted trough the optical fiber to the receiver unit 12. At the receiver unit 12, a 2.5 GHz photodiode detector converts the optical signal into an electrical signal which, in turn, is further digitally processed by an appropriate processor 13, using estimation techniques. As a result, an output of 10 Gb/s with minimal bit error rate is reconstructed.

This implementation, as well, allows either lowering the transmission rate by a factor of N (thereby avoiding the need of increasing the TDM data rate), or conversely allowing the multiplexing of N independent channels, without needing costly WDM. Therefore, this example of TDMM implementation requires only a single driver (rather than four drivers at 2.5 GHz) and a single low-cost laser source at 2.5 GHz.

It should be noted that the method proposed by the present invention can be implemented for all types of modulation, such as AM, FM, PM and any combination thereof (since in most cases, modulation is converted to AM in the receiver side).

The above examples and description have of course been provided only for the purpose of illustration, and are not intended to limit the invention in any way. A will be appreciated by the skilled person, the invention can be carried out in a great variety of ways, employing more than one technique from those described above, all without exceeding the scope of the invention.

The invention claimed is:

1. A method for efficiently increasing the capacity of a data channel being capable of operating in a given data rate B comprising:
   a) determining a number of N (N>1) modulated data streams to be simultaneously transmitted from a transmission end to a receiving end of said channel;
   b) generating said N modulated data streams, each of which having a bit rate of B/N and a bit-time of N/B;
   c) at said transmission end,
   c.1) generating a shift of 1/B*N between the first modulated data stream and each of its N−1 subsequent modulated data streams;
   c.2) combining said first modulated data stream and its shifted subsequent modulated data streams into a reduced bandwidth signal having up to N levels;
   c.3) transmitting said reduced bandwidth signal to as receiving end of said channel;
   d) at said receiving end,
   d.1) sampling said reduced bandwidth signal N times during each bit-time, thereby obtaining a vectorial stream having N elements at each time, such that each element has N+1 possible values; and
   d.2) equalizing the received vectorial stream to reconstruct each of said N modulated data streams.

2. Method according to claim 1, wherein the received vectorial stream is equalized by calculating the joint conditional PDF.

3. Method according to claim 1, wherein reconstruction includes performing MLSE for the received vectorial stream by calculating the joint conditional PDF.

4. Method according to claim 1, wherein the MLSE is vectorial.

5. Method according to claim 1, wherein the shift between channels is obtained using time delay of 1/B*N.

6. Method according to claim 1, wherein the shift between channels is a phase shift.

7. Method according to claim 1, wherein the reduced bandwidth signal is being processed at the receiving side as having MAI (Multi Access Interference) with deterministic properties.

8. Method according to claim 7, wherein the MAI associated with the reduced bandwidth signal is corrected as ISI.

9. Method according to claim 1, wherein the data channel is a channel into which two or more optical signals having different frequencies are gathered using WDM.

10. Method according to claim 4, wherein the vectorial MLSE is performed using the Viterbi Algorithm.

11. Method according to claim 1, wherein the modulated data stream is generated using low cost laser sources with direct modulation.

12. Method according to claim 1, wherein the N modulated data streams are generated using low cost laser sources with direct modulation.

13. Method according to claim 1, wherein the N modulated data streams are generated using a low cost, narrow bandwidth, single laser source with direct modulation.

14. Method according to claim 1, wherein the N modulated data streams are generated from a data stream having a bit rate which is higher by a factor of N.

15. System for efficiently increasing the capacity of a data channel, being capable of operating in a given data rate B between a transmission end and a receiving end, comprising:
   a) a transmitter at said transmission end, for simultaneously transmitting N modulated data streams, each of which having a bit rate of BIN and a bit-time of N/B, to a receiving end of said channel, consisting of
   a.1) a plurality of signal sources for generating said N modulated data streams;
   a.2) means for generating a shift of 1/B*N between the first modulated data stream and each of its N−1 subsequent modulated data streams
   a.3) a combiner for combining said first modulated data stream and its shifted subsequent modulated data streams into a reduced bandwidth signal having up to N levels,
   b) a receiver a receiving end, for receiving said reduced bandwidth signal, that consists of:
   b.1) circuitry for sampling said reduced bandwidth signal N times during each hit time and for obtaining a vector having N elements at each time, such that each element has N+1 possible values; and
   b.2) a processor for performing vectorial MLSE for each element by calculating the joint conditional PDF and for reconstructing each of said N modulated data streams.

16. System according to claim 15, in which the processor processes the reduced bandwidth signal as having MAI with deterministic properties.

17. System according to claim 15, in which the processor corrects the MAI associated with the reduced bandwidth signal as being ISI.

18. System according to claim 15, in which the vectorial MLSE is performed using the Viterbi Algorithm.

19. System according to claim 15, in which each element corresponds to the order of a sample.

* * * * *